United States Patent Office 3,493,466
Patented Feb. 3, 1970

3,493,466
METHOD AND PREPARATION FOR CLINICAL DIAGNOSIS
Nobuhiko Katsunuma, Tokushima-shi, Japan, assignor to Chugai Seiyaku Kabushiki Kaisha, Tokyo, Japan, a corporation of Japan
No Drawing. Filed May 5, 1966, Ser. No. 547,726
Claims priority, application Japan, May 11, 1965, 40/27,107, 40/27,108
Int. Cl. C12k 1/04
U.S. Cl. 195—103.5                                  7 Claims

ABSTRACT OF THE DISCLOSURE

A method for determining the enzyme activity of a carbonyl compound-$NADH_2$ redox enzymes other than malic dehydrogenase in a body fluid by coupling the reaction of said redox enzyme with a malic dehydrogenase to form oxalacetic acid and measuring the amount of oxalacetic acid as formed.

---

This invention relates to a novel method and a preparation for the clinical diagnosis, particularly relates to a method for the determination of the enzymic activity of CO-comp-$NADH_2$ redox enzyme and a preparation therefor.

The term "CO-compound" as used herein defines carbonyl compound and the term "CO-comp-$NADH_2$ redox enzyme" defines the enzyme which takes part in the enzymic oxidation-reduction reaction of CO-compound and the compound containing hydroxy, aldehyde, carbonyl, amino radical or the like (mentioned below as "reduced CO-compound") as follows:

CO-compound+$NADH_2$→reduced CO-compound+NAD wherein NAD is nicotinamide-adenine dinucleotide and $NADH_2$ is the reduced type thereof.

It is known that the activity of CO-comp-$NADH_2$ redox enzyme in tissues or body fluids is varied in case of various diseases of heart, liver or the like, and for this reason the determination of the enzymic activity in body fluids of CO-comp-$NADH_2$ redox enzyme has been carried out in the diagnosis of these diseases.

Hitherto, two types of method have been routinely used forthe determination of the enzymic activity of CO-comp-$NADH_2$ redox enzyme in clinical and biochemical investigations. These methods are based on different principles, being (a) a method using spectrophotometry: (b) a method involving the color developed by 2,4-dinitrophenylhydrazone of either unreacted alpha-keto acids or those formed. The former is an accurate and simple method, but it requires an ultraviolet spectrophotometer for the estimation of the optical density at 340 mμ. Accordingly, when a large number of assays must be done, such as in clinical investigations, it takes much time. The latter method has the advantage that it does not require an ultraviolet spectrophotometer, but it is less sensitive and inaccurate.

Accordingly, an object of this invention is to provide a novel method for the determination of the enzymic activity of CO-comp-$NADH_2$ redox enzyme.

A further object of this invention is to provide a simple and accurate method for the determination of the enzymic activity of CO-comp-$NADH_2$ redox enzyme.

Another object of this invention is to provide a preparation therefor.

Still another object of this invention is to provide a stable and convenient preparation therefor.

The determination method of this invention comprises coupling two enzymic reactions, that is, CO-comp-$NADH_2$ redox enzymic reaction and the malic dehydrogenase reaction converting NAD formed as the result of CO-comp-$NADH_2$ redox enzymic reaction, and the added malic acid into $NADH_2$ and oxalacetic acid respectively, malic dehydrogenase (mentioned below as "MDH") reaction and measuring the amount of the formed oxalacetic acid.

According to this invention, the enzymic activity of CO-comp-$NADH_2$ redox enzyme is determined by adding a CO-compound, $NADH_2$, malic acid or its salt and MDH to a suitable volume of a sample solution to cause the above mentioned enzymic reactions and measuring the amount of the formed oxalacetic acid.

The mechanism of enzymic reactions is shown as follows:

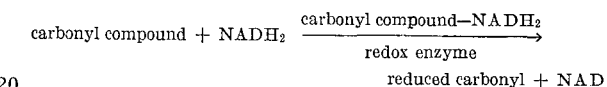

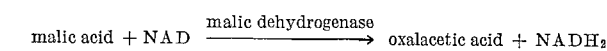

As shown in the above mechanism, the CO-compound added to the sample solution is converted into a corresponding reduced CO-compound by the action of CO-comp-$NADH_2$ redox enzyme to be determined, accompanying the formation of NAD from $NADH_2$. The formed NAD reacts with malic acid by MDH to form the equivalent amounts of oxalacetic acid and $NADH_2$ to that of NAD. The amounts of the formed oxalacetic acid is proportioned to the degree of the enzymic activity of CO-comp-$NADH_2$ redox enzyme. Therefore, the enzymic activity of CO-comp-$NADH_2$ redox enzyme may be determined by measuring the amount of the formed oxalacetic acid.

In practice, the enzymic activity of CO-comp-$NADH_2$ redox enzyme may be determined by adding a CO-compound, $NADH_2$, MDH and malic acid or its salt to a suitable amount of a sample solution containing CO-comp-$NADH_2$ redox enzyme, adjusting the pH in the reaction medium between about 7 and about 9, preferably 8.0 by the addition of a buffer composition, incubating at 30–40° C., preferably at 37° C., for the proper time interval, generally 15–30 minutes, to form oxalacetic acid, and measuring the amount of the formed oxalacetic acid. All of these agents may be added one by one or as a mixture or mixtures, which are previously and suitably mixed.

Since the above mentioned two enzymic reactions are reversible, it is required to take care of the amount of the substrates to be added. Malic acid or its salt, $NADH_2$, and a CO-compound may generally be used at the molar ratio of 300–500:0.5–2:30–60, preferably 400:1.8:40. Malic acid may be used in the form of a water soluble salt, for example, mono- or di-lithium, sodium- or potassium salts.

The amount of MDH is not critical, with the exception that a substantial excess thereof should be added. For example, when the activity in the body fluid is determined, MDH is preferably added over 10M I.U., preferably 10–100M I.U. to 0.2 ml. of body fluid.

To promote the enzymic reaction smoothly, it is preferable to use a buffer composition to keep the pH of a reaction medium during the measurement between about 7 and about 9. This HCl buffer, phosphate buffer and the like may be advantageously used.

The amount of the formed oxalacetic acid may be estimated after the reaction period by ordinary analytic methods, wherein the most advantageous method is a colorimetrical method using a color developer agent, especially an azonium salt.

Some of azonium salts do not inhibit the enzymic reactions, but they react with oxalacetic acid specifically under the controlled conditions to form a colored coupling material which has an absorption in visible spectrum. An azonium salt, therefore, may be added to the enzymic reaction medium before or after incubation, and the amount of the formed oxalacetic acid may be advantageously measured by using a colorimeter or visually by comparing the developed color with a standard color chart. As such an azonium salt, it may be mentioned, for example, 4 - amino - 2,5 - diethoxybenzanilide diazonium chloride, 6-benzamide-4-methoxy-m-toluidine diazonium chloride, tetrazotized O-di-anisidine and the like. Some of azonium salts may be more advantageously used in the form of a double salt with an inorganic halide, sulfate or the like of a metal such as cadmium, manganese, zinc, magnesium and the like, for example manganese chloride, magnesium chloride, cadmium chloride, zinc chlorode and the like, for the reason described below.

The amount of the formed oxalacetic acid may be also measured by using 2,4-dinitrophenylhydrazine. In this method, the amount of the formed oxalacetic acid may be determined as 2,4-dinitrophenylhydrazone derivative. It may be advantageously determined in the solution containing oxalacetic acid only, which may be prepared for example by column- or paper-chromatography.

The amount of the formed oxalacetic acid may be also measured by using a mixture of aniline and citric acid. According to this method, the formed oxalacetic acid is decomposed by the action of a mixture of aniline and citric acid into pyruvic acid and carbon dioxide and the enzymic activity may be determined by the measurement of the amount of carbon dioxide gas using Warburg's manometer.

It may be also measured by the combined above two methods. That is, the enzymic activity may be measured by decomposing the formed oxalacetic acid into pyruvic acid and carbon dioxide, and measuring the amount of the formed pyruvic acid by using 2,4-dinitrophenylhydrazine. But, when lactic-dehydrogenase transaminase activity is determined, the formed oxalacetic acid must be separated from the reaction mixture to determine the amount thereof, because an excess of pyruvic acid has been added in the reaction medium.

In the measurement of the amount of the formed oxalacetic acid using anazonium salt, it is advantageous to be measured after stopping the enzymic and the color developing reactions. The enzymic reaction may be stopped by the addition of an organic solvent mismible with water, for example, methanol, ethanol, isopropanol and the like, and the color developing reaction may be stopped by controlling the pH in the reaction medium, generally by the addition of an organic and/or an inorganic acid such as acetic, trichloroacetic, sulfuric, hydrochloric acids and the like.

In general, the measurement is carried out after the stopping of the color developing reaction, followed after the stopping of the enzymic reaction. But in case of using 6-benzamido - 4 - methoxy-m-toluidine diazonium chloride or the double salt thereof with an inorganic metallic salt, the above two reactions may be simultaneously stopped because the optimum pH of the enzymic and the color developing reactions are almost the same and the formed oxalacetic acid rapidly reacts with this azonium salt. In this case, accordingly, a mixture of alcohol and sulfuric acid or hydrochloric acid at the ratio of 95–99:5–1 by volume may be advantageously used as a reaction stopper agent. The enzymic reaction is inhibited by 2,4-dinitrophenylhydrazine, so that it is not required to use an enzymic reaction stopper agent, in case of using 2,4-dinitrophenylhydrazine. In the measurement using Warburg's manometer, the use of an enzymic reaction stopper agent is not required for the same reason.

As a CO-comp-$NADH_2$ redox enzyme to be determined according to this invention, it may be mentioned lactic dehydrogenase, α-hydroxybutyric dehydrogenase, alcohol dehydrogenase, triose phosphate dehydrogenase, glutamic dehydrogenase and the like. A CO-compound used in this invention must be selected according to CO-comp-$NADH_2$ redox enzyme to be determined.

Describing a CO-compound corresponding to CO-comp-$NADH_2$ redox enzyme to be determined, pyruvic acid to lactic dehydrogenase, 1,3-diphosphoglyceric acid to triose phosphate dehydrogenase, α-ketogultaric acid to glutamic dehydrogenase, α-ketobutyric acid to α-hydroxybutyric dehydrogenase, acetaldehyde to alcohol dehydrogenase are used.

These keto acids are converted by the corresponding enzymes respectively into the reduced CO-compounds such as lactic acid, glyceraldehyde-3-phosphate, glutamic acid, α-hydroxybutyric acid and ethanol.

According to this invention, the enzymic activity of all the CO-comp-$NADH_2$ redox enzymes may be determined simply and accurately without using an ultraviolet spectrophotometer and it is convenient when a large number of assays must be done. Especially, in case of using an azonium salt, it is very convenient in the point that it is possible to measure the formed oxalctic acid using a colorimeter or visually comparing the developed color with a standard color chart.

Reaction agents used in this invention are as follows:

(1) a CO-compound
(2) $NADH_2$
(3) malic acid or its salt
(4) MDH
(5) an oxalacetic acid determining agent
(6) a buffer composition adjusted to maintain the pH in the reaction medium during the measurement.

Other than these agents described above, a reaction stopper agent and an inactive diluent may be used, if necessary.

These agents, (1)–(6) may be added one by one, or as a mixture or mixtures thereof. Generally, it is convenient to use the preparation, which is prepared by mixing some or all of these agents just before use or previously. Especially, to simplify the determination procedure, it is the most advantageous to use the previously prepared preparation such as tablet, powder, granule, liquid or the like.

As a typical suitable preparation, it may be mentioned as follows.

Type A.—A set comprising as follows:
(1) A preparation comprising
   a CO compound
   $NADH_2$
   malic acid or its salt
   MOH
   an oxalacetic acid determining agent
   a buffer composition adjusted to maintain the pH in the reaction medium during the measurement between about 7 and about 9.

Suitable preparation form: tablet, powder and granule.
(2) An enzymic reaction stopper agent
(3) A color developing stopper agent Type B.—A set comprising as follows:
(1) A preparation comprising
   a CO-compound
   malic acid or its salt
   a buffer composition adjusted to maintain the pH in the reaction medium during the measurement between about 7 and about 9.

Suitable preparation form: aqueous solution, tablet, powder and granule.

(2) A preparation comprising
NADH$_2$
MDH

Suitable preparation form: tablet, powder, granule and an implement comprising porous sheet material impregnated with the above mixture.

(3) An oxalacetic acid determining agent

Suitable preparation form: table, powder and granule (4) An enzymic reaction stopper agent (5) A color developing reaction stopper agent Type C.—A set comprising as follows:

(1) A mixture comprising
a CO-compound
NADH$_2$
malic acid or its salt
MDH
a buffer composition adjusted to maintain the pH in a reaction medium during the measurement between about 7 and about 9.

Suitable preparation form: tablet, powder and granule.

(2) An oxalacetic acid determining agent

Suitable preparation form: tablet, powder and granule.

The preparation of type A may be prepared by adding an inactive diluent, e.g. lactose, polyvinylpyrrolidone, carboxymethylcellulose and the like, to a mixture composed of a CO-compound, NADH$_2$, MDH, malic acid or its salt, a buffer composition adjusted to maintain the pH in the reaction medium during the measurement between about 7 and about 9 and an oxalacetic acid determining agent to give powder, granule or tablet form. The liquid form may be also prepared, but it is not suitable for the long preservation. Of the preparation of type A, it is necessary that the oxalacetic acid determining agent does not inhibit the enzymic reaction. In this sense, the use of an azonium salt is the most suitable. And when an azonium salt, which forms a colored coupling material by reacting oxalacetic acid in the same pH range as that in the enzymic reaction, is used, the second and the third stopper solution may be mixed to make a single reaction stopper solution as far as they are miscible without any reaction, for example ethanol-sulfuric acid mixture.

The preparation of this type is suitable for the quantitative and the semi-quantitative analyses.

The method for the determination of the enzymic activity of CO-comp-NADH$_2$ redox enzyme using the preparation of type A is as follows:

At first, the preparation is dissolved in a small volume of distilled water. To a suitable amount of a sample solution is added the said solution and the mixture is incubated at 30–40° C., preferably at 37° C., for a proper time interval. The color develops gradually, in proportion as the amount of the formed oxalacetic acid. After the incubation, the enzymic reaction stopper solution and the color developing stopper solution are added thereto to stop the enzymic reactions and the color formation. The enzymic activity of CO-comp-NADH$_2$ redox enzyme may be obtained by measuring optical density of the supernatant using a colorimeter or by comparing visually the developed color with a standard color chart.

The first preparation of type A may be advantageously divided into three preparations because the NADH$_2$ and MDH are relatively unstable, and the amounts to be used are very little and because some of the color developer agents are relatively unstable. For these reasons, the preparation of type B is advantageously used in case of the quantitative analysis of CO-comp-NADH$_2$ redox enzyme.

The first preparation of type B may be prepared by the same manner as in the first preparation of type A.

The second preparation of type B may be prepared by adding an inactive diluent to a mixture of NADH$_2$ and MDH, and it is very convenient to use as a porous sheet material such as filter paper disc impregnated with a mixture solution of NADH$_2$ and MDH.

As the oxalacetic determining agent which is used in the third preparation an azonium salt may be advantageous.

As mentioned hereinbefore, an azonium salt is advantageous used in the first two preparation types.

In case of using 2,4-dinitro-phenylhydrazine as the oxalacetic acid determining agent, the preparation of type C is advantageously used because no reaction stopper agent is required The method for the determination of the enzymic activity of CO-comp-NADH$_2$ redox enzyme using the preparation of type C where oxalacetic acid determining agent is 2,4-dinitrophenylhydrazine is as follows:

The first preparation is dissolved in a small volume of distilled water. To a suitable amount of a sample solution is added the said solution and the mixture is incubated at 30°–40° C., preferably at 37° C., for a proper time interval.

After the incubation, the second preparation containing 2,4-dinitrophenylhydrazine is added and the amount of the formed oxalacetic acid is measured. The color is formed by the addition of alkaline solution such as sodium hydroxide, potassium hydroxide, lithium hydroxide and the like.

After the completion of the color formation, the amount of the formed oxalacetic acid may be determined by the measurement of the optical density at 505 m$\mu$. In this case, the enzymic reaction is inhibited by the addition thereof, so that no enzymic reaction stopper solution is required.

Other than these three types, various types may be considered on the preparation type.

Generally speaking, when the preparation is prepared just before use, any preparation form may be advantageously used, but it is generally convenient to use a suitable preparation which is previously prepared.

The perparation containing a CO-compound and/or malic acid or its salt only as active ingredients may be used as an aqueous liquid form or a solid form such as tablet, granule or powder, each of which may be prepared by the same manner as in the first substrate preparation of type A.

The preparation containing NADH$_2$ and/or the enzyme and/or an azonium salt is advantageously formed into a solid form, because such a solution is unstable in the state of aqueous solution, that is, the former is liable to be inactivated by various factors and the latter is liable to be decomposed by light or heat.

As the oxalacetic acid determining agent, an azonium salt, 2,4-dinitrophenylhydrazine or the like, especially an azonium salt, may be used. In case of using 2,4-dinitrophenylhydrazine, it must be separated as a single preparation, because this agent inhibits the enzymic reaction.

As an azonium salt, those as are described above may be used. Among these azonium salts, 6-benzamide-4-methoxy-m-toluidine diazonium chloride, preferably in the form of a double salt with an inorganic metallic salt, is most advantageous.

Comparing 6-benzamide-4-methoxy-m-toluidine diazonium chloride with a double salt thereof, the double salt of 6-benzamide-4-methoxy-m-toluidine diazonium chloride and zinc chloride, the former is unstable for humidity and heat, so that it is necessary to take care of the preparation form and its preservation condition, but the latter is more stable and react with oxalacetic acid specifically to form a colored coupling material, even in case the ethanol solution thereof is allowed to stand for one month at cold. 6-benzamide-4-methoxy-m-toluidine diazonium chloride reacted with oxalacetic acid specifically gives a red colored coupling material which gives a maximum absorption at 520–530 m$\mu$ in an alkaline condition and gives a yellow colored coupling material in an acidic condition, a coupling material which shows a maximum absorption at 410 mµ at pH 6.0. Any of these color developments may be used for the measurement of oxalacetic acid, but it is advantageous to employ a red color in an alkaline condition.

Development of the red color is rapid in a room temperature, and the formed colored coupling material is stable for several hours in an acidic condition. But after then, the solution often gives a precipitation of colored coupling product depending upon the concentration of oxalacetic acid, and in this condition the measurement happens to become impossible. To overcome this disadvantage, the addition of ethanol over 50% gives good results, that is, ethanol added dissolves the precipitate. Accordingly, an azonium salt may advantageously be used in the form of an aqueous or an organic solvent solution such as ethanol solution.

Instead of using the double salt in the state of liquid, the mixture solution of diazonium salt and an inorganic metallic salt may be also used This color developer agent does not react with α-ketoglutaric acid, even if the concentration thereof is 3.3 mmol. Even if the sample of which the enzymic activity is determined is turbid with the presence of other inactive protein or the like, it is possible to carry out the determination because the color is developed also in high concentration of ethanol over 50% and the sample solution becomes clear by precipitation of protein by the presence of ethanol.

This invention will be widely applied for such an industrial field, for example, fermentation industries and pharmaceutical industries, and for clinical diagnosis, but also in a field as the determination of a glutamic keto acid transaminase activity is required.

EXAMPLE 1

A method for the determination of the lactic dehydrogenase activity.—24.2 mg. of tris(hydroxymethyl)-aminomethane, 26.8 mg. of malic acid, 0.333 mg. of $NADH_2$, 0.5 mg. of the double salt of 6-benzamido-4-methoxy-m-toluidine and zinc chloride, 10.0 mg. of MDH (3860M I.U./g.), 2.0 mg. of sodium pyruvate were dissolved in 3.0 ml. of distilled water and thereto was added 1.0 ml. of a sample solution (10 times diluted solution of the supernatant of homogenized pig heart). The mixture was reacted at 37° C. for 30 minutes and thereto were added 3.0 ml. of ethanol and 1.0 ml. of 1 N HCl. After the centrifugation at 3000 r.p.m. for 10 minutes, the optical density of the supernatant was determined at 520 mµ in a colorimeter.

EXAMPLE 2

A method for the determination of the α-hydroxybutyric dehydrogenase activity.—65 mg. of a mixture containing 2.42 g. of tris(hydroxymethyl)-aminomethane, 2.68 g. of malic acid, 33.3 mg. of $NADH_2$, 1.0 g. of MDH (3860 M I.U./g.) and 246 mg. of sodium α–ketobutyrate were dissolved in 3 ml. of distilled water and thereto was added 1.0 ml. of a sample solution (the same as in Example 1) and further 0.5 mg. of the double salt of 6-benzamido-4-methoxy-m-toluidine diazonium chloride and magnesium chloride. The mixture was reacted at 37° C. for 30 minutes and thereto were added 3.0 ml. of ethanol and 1.0 ml. of 1 N HCl. After the centrifugation at 3000 r.p.m. for 30 minutes, the optical density of the supernatant was determined at 520 mµ in a colorimeter.

EXAMPLE 3

A method for the determination of the lactic dehydrogenase activity.—The following solutions were pipetted into the main compartment of Warburg's cup: 24.2 mg. of tris(hydroxymethyl)-aminomethane, 26.8 mg. of malic acid, 0.333 mg. of $NADH_2$, 10.0 mg. of MDH (3860 M I.U./g.), and 0.2 ml. of serum. After 10 minutes of the incubation at 37° C., 2.0 mg. of sodium pyruvate dissolved in 0.2 ml. of distilled water was tipped from the first side arm and incubated at 37° C. for 30 minutes, and then 0.5 ml. of aniline citrate reagent, which was prepared by mixing equal volumes of aniline and citric acid solution (50 g. of citric acid in 50 ml. of water), was tipped from the second side arm, and the gas evolved was measured within 10 minutes.

A control containing all the reagents except the enzymic solution was run simultaneously.

EXAMPLE 4

The determination of lactic dehydrogenase activity.—24.2 mg. of tris(hydroxymethyl)-aminomethane, 26.8 mg. of malic acid, 0.333 mg. of $NADH_2$, 10.0 mg. of MDH (3860M I.U./g.), 2.0 mg. of sodium pyruvate were dissolved in 3.0 ml. of distilled water and thereto was added 1.0 ml. of a sample solution (10 times diluted solution of the supernatant of homogenized pig heart). The mixture was reacted at 37° C. for 30 minutes and thereto was added 1.0 ml. of 1 N HCl.

To the resulting solution was added 5.0 ml. of 10% metaphosporic acid and the solution was shaken and filtered. To 4.0 ml. of the filtrate was added 1.0 ml. of 2,4-dinitrophenylhydrazine solution, which was prepared by adding 0.1 g. of 2,4-dinitrophenylhydrazine in 100 ml. of 2 N HCl, and the solution was mixed and incubated at 30° C. for 30 minutes. The reaction mixture was ice-cooled and the extraction was carried out 3 times using each 8.0 ml. of ethylacetate solution and further carried out using 2.0 ml. of carbonate solution, which was prepared by dissolving 50 g. of sodium carbonate and 5 g. sodium bicarbonate into water to make the whole volume 1 liter.

After 0.5 ml. of 6 N HCl solution was added to the ice-cooled extracts, the extracts were extracted with 8.0 ml. of ethylacetate.

The obtained extract was dried under reduced pressure. The dried material was dissolved in acetone, and the solution was spotted on the filter paper to carry out paper chromatography.

| 2,4-dinitrophenylhydrazone | Rf |
|---|---|
| Pyruvic acid | 0.35 |
| Oxalacetic acid | 0.12 |

After the filter paper was dried, the spot of oxalacetic acid was cut off and the section was extracted with a small volume of carbonate solution.

Optical density of the extract was measured at 505 mµ in a colorimeter.

EXAMPLE 5

A preparation for the determination of the lactic dehydrogenase activity.

| | Mg. |
|---|---|
| Tris(hydroxymethyl)-aminomethane | 24.2 |
| $NADH_2$ | 0.333 |
| Malic acid | 26.8 |
| 6-benzamido-4-methoxy-m-toluidine diazonium chloride | 0.50 |
| NDH (3860M I.U./g.) | 10.0 |
| Sodium pyruvate | 2.0 |

Lactose was added thereto to tablet weighing 80 mg. of a whole quantity.

For use, this tablet was dissolved in 3.0 ml. of distilled water and thereto was added 1.0 ml. of a sample solution (for example, 10 times diluted solution of the supernatant of homogenized pig heart).

After reacting at 38° C. for 30 minutes, 3.0 ml. of ethanol and 1.0 of 1 N HCl were added.

The solution was centrifuged at 3000 r.p.m. for 10 minutes and the optical density at 520 mµ of the supernatant was determined in a colorimeter.

EXAMPLE 6

A preparation for the determination of the α-hydroxybutyric dehydrogenase activity.

TABLET A

|  | Mg. |
|---|---|
| Tris(hydroxymethyl)aminomethane | 24.2 |
| Malic acid | 26.8 |
| $NADH_2$ | 0.333 |
| MDH (3860 M I.U./g.) | 2.46 |
| Sodium α-ketobutyrate | 2.46 |

Lactose was added thereto to 80 mg. of a whole quantity to tablet by an ordinary method.

TABLET B

The double salt of 6-benzamino-4-methoxy-m-toluidine diazonium chloride and manganese chloride (5 mg.).

Lactose was added thereto to 200 mg. of a whole quantity to give 10 tablets each weighing 20 mg.

For use, tablet A was dissolved in 3.0 ml. of distilled water, and if necessary, the pH of the solution was adjusted to 7.4 with sodium hydroxide. 1.0 ml. of the sample solution (the same in Example 1) was added and further tablet B was added and dissolved thereinto. After the reaction at 38° C. for 30 minutes, 3.0 ml. of ethanol and 1.0 ml. of 1 N HCl were added. After the centrifugation at 3,000 r.p.m. for 10 minutes, the optical density of the supernatant was determined at 520 mμ in a colorimeter.

What I claim is:

1. A method for the determination of enzymic activity of a carbonyl compound-$NADH_2$ redox enzyme other than malic dehydrogenase comprising adding a carbonyl compound selected from the group consisting of pyruvic acid, 1,3-diphosphoglyceric acid, α-ketoglutaric acid, α-ketobutyric acid and acetaldehyde; reduced nicotinamide-adenine dinucleotide; malic acid or its water soluble salts; and malic dehydrogenase to a suitable volume of a sample solution containing the enzyme to be determined, adjusted the pH to between about 7 and about 9, incubating the mixture at 30 degrees to 40 degrees centigrade to form oxalacetic acid and determining the amount of the oxalacetic acid so formed the carbonyl compound, reduced nicotinamide-adenine dinucleotide and malic acid or its water soluble salts being in a molar ratio of 30-60: 0.5-2:300-500.

2. A method as claimed in claim 1, in which the water soluble salt of malic acid is selected from the group consisting of lithium salts, sodium salts and potassium salts.

3. A method as claimed in claim 1, in which the determination of the formed oxalacetic acid is carried out colorimetrically using an azonium salt.

4. A method as claimed in claim 3, in which the azonium salt is 6-benzamide-4-methoxy-m-toluidine diazonium chloride.

5. A method as claimed in claim 3, in which the azonium salt is selected from the group consisting of 4-amino-2,5-diethoxybenzanilide diazonium chloride, and tetrazotide o-dianisidine.

6. A method as claimed in claim 3, in which the azonium salt is a double salt of 6-benzamido-4-methoxy-m-toluidine diazonium chloride and an inorganic metallic salt.

7. A method as claimed in claim 6, in which the inorganic metallic salt is selected from the group consisting of manganese chloride, magnesium chloride, cadmium chloride and zinc chloride.

References Cited

UNITED STATES PATENTS

| 2,996,436 | 8/1961 | Broida et al. | 195—103.5 |
| 3,331,752 | 7/1967 | Struck | 195—103.5 |

ALVIN E. TANENHOLTZ, Primary Examiner

U.S. Cl. X.R.

23—230